April 10, 1928. Re. 16,925
J. K. DIAMOND
MACHINE FOR SETTING OR APPLYING BELT FASTENERS AND THE LIKE
Original Filed March 30, 1925 2 Sheets-Sheet 1
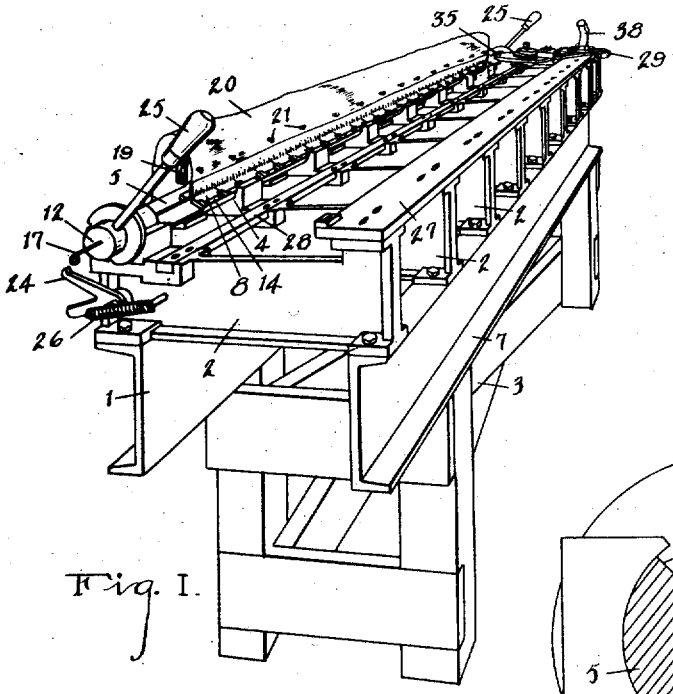
Fig. I.
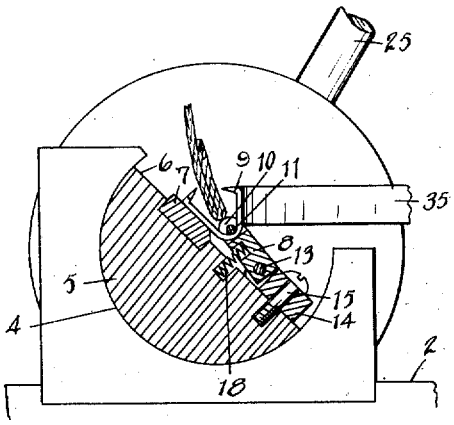
Fig. IV.
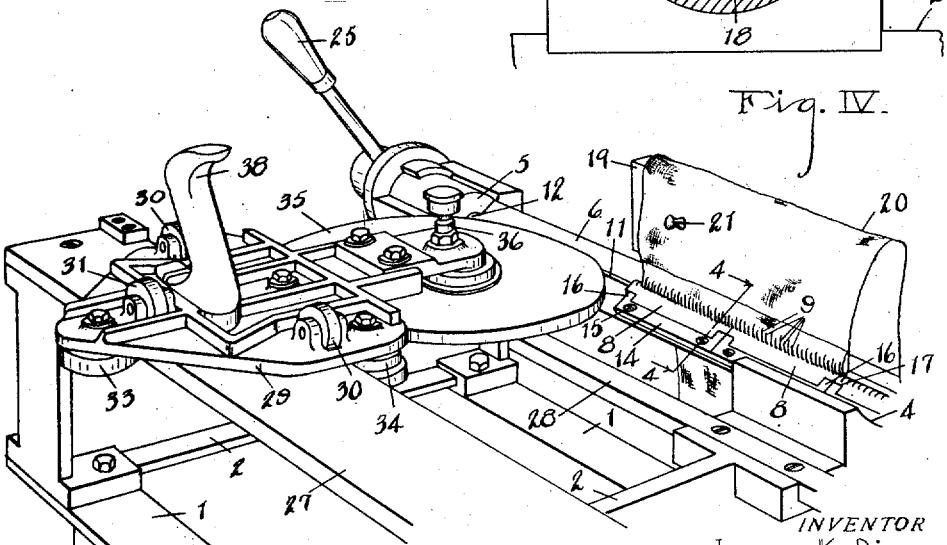
Fig. II.
INVENTOR
James K. Diamond
BY Chappell & Earl
ATTORNEYS April 10, 1928. Re. 16,925
J. K. DIAMOND
MACHINE FOR SETTING OR APPLYING BELT FASTENERS AND THE LIKE
Original Filed March 30, 1925 2 Sheets-Sheet 2
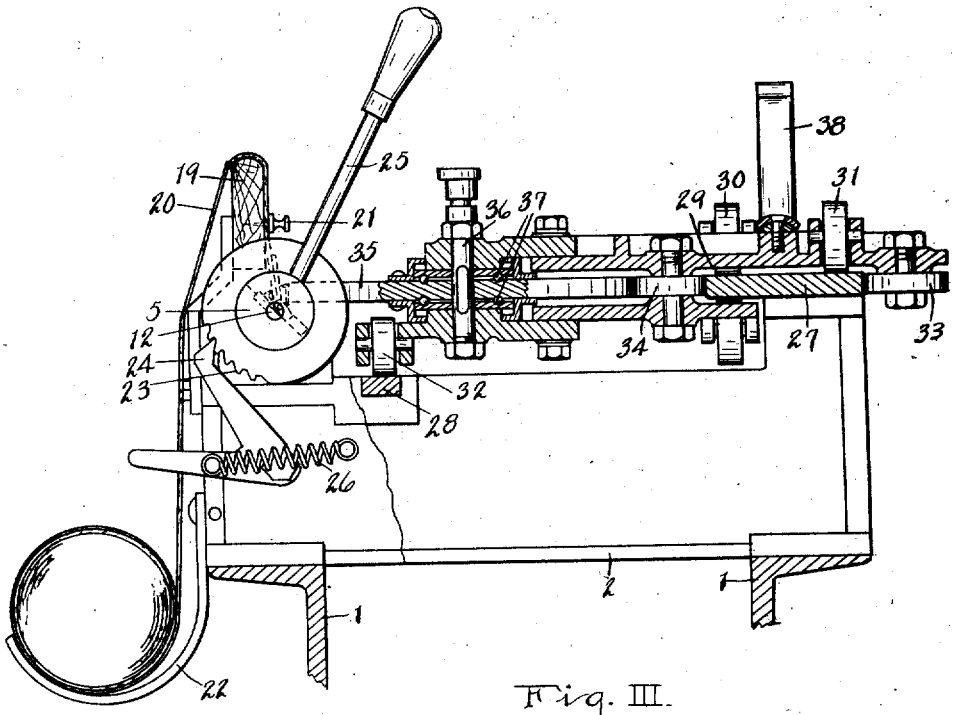
Fig. III.
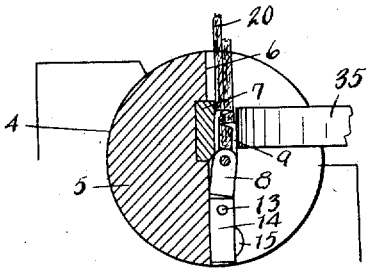
Fig. V.
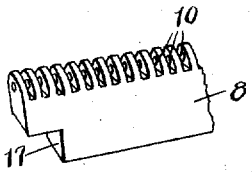
Fig. VI.
INVENTOR
James K. Diamond
BY Chappell & Earl
ATTORNEYS Reissued Apr. 10, 1928. Re. 16,925

UNITED STATES PATENT OFFICE.

JAMES K. DIAMOND, OF GRAND RAPIDS, MICHIGAN, ASSIGNOR TO CLIPPER BELT LACER COMPANY, OF GRAND RAPIDS, MICHIGAN.

MACHINE FOR SETTING OR APPLYING BELT FASTENERS AND THE LIKE.

Original No. 1,563,345, dated December 1, 1925, Serial No. 19,480, filed March 30, 1925. Application for reissue filed April 23, 1926. Serial No. 104,221.

This invention relates to improvements in machines for setting or applying belt fasteners and the like.

The main objects of this invention are:

First, to provide an improved belt fastener applying machine which is well adapted for the applying of fasteners to wide belts or aprons, such, for instance, as the aprons of ironing machines.

Second, to provide an improved machine of the class described which has a wide range of adaptability or is adapted for belts or aprons of varying thicknesses and widths and for applying fasteners of varying sizes.

Third, to provide a machine of the class described by means of which the fasteners may be effectively applied.

Objects pertaining to details and economies of construction and operation of my invention will definitely appear from the detailed description to follow.

I accomplish the objects of my invention by the devices and means described in the following specification. The invention is clearly defined and pointed out in the claims.

A structure which is a preferred embodiment of my invention is clearly illustrated in the accompanying drawing forming a part of this application, in which:

Fig. I is a perspective view of an embodiment of my invention especially adapted for wide belts or aprons.

Fig. II is a fragmentary perspective view.

Fig. III is a detail view partially in vertical transverse section.

Fig. IV is an enlarged detail section on a line corresponding to line 4—4 of Fig. II the closing jaw being shown advanced to the position of the section line.

Fig. V is a detail section corresponding in general to Fig. IV with the parts adjusted to another position.

Fig. VI is a fragmentary perspective view showing details of the fastener holder.

In the drawing similar numerals of reference indicate similar parts throughout the several views.

Referring to the drawing, the structure illustrated is provided with a bed comprising longitudinal rails 1, 1 having a plurality of cross pieces 2 mounted thereon to provide a rigid structure. The structure illustrated is adapted to be supported by a suitable pedestal or supporting frame as 3.

The cross pieces 2 are provided with bearings 4 for the shaft-like anvil jaw member 5, this jaw member being rotatably supported in these bearings. A plurality of bearings is provided to prevent the springing of the shaft which, in machines designed for applying the lacers or fasteners to ironing machine aprons, for instance, is of considerable length.

This anvil jaw member has a flat face 6, the jaw plate or bar 7 being preferably set into this face above the axial center of the jaw member, see Fig. IV. Below the jaw plate 7 I mount a holder 8 adapted to receive a plurality of fasteners or belt lacing hooks 9, the holder having a series of transverse slits 10 therein and a longitudinal hole passing through the slits adapted to receive the fastener retaining rod 11. This rod projects for convenience in manipulation through the hole 12 in the end of the jaw member.

The holder 8 is pivoted at 13 on the supporting bar 14 which is secured to the jaw member 5 by means of the screws 15. This supporting bar 14 has a plurality of pivot knuckles 16 projecting into recesses 17 provided in the lower edge of the holder to receive the same. The holder is held yieldingly forward by the springs 18, the main purpose of this being to assist in lining the hooks. The outward movement of the support is limited to the position indicated in Fig. IV.

Above the jaw member 5 is a work support 19. The work as the belt or apron 20 is drawn over this support and secured as by means of the thumb tacks 21 with its end in proper relation to the fasteners as shown in Fig. IV. Brackets 22 are provided for supporting the work at the rear of the machine.

The jaw member 5 is provided with a ratchet 23 with which the pawl 24 mounted on the frame coacts so that the jaw member is held in its adjusted positions and may be adjusted step by step. A hand lever 25 is provided for this adjustment.

The spring 26 is adapted to hold the pawl both in operative position as shown in Fig. III or in inoperative position as shown in Fig. I.

At the front of the bed I mount a way 27 disposed in the structure illustrated in approximately the horizontal plane of the anvil jaw member and in parallel relation thereto. A track 28 is mounted in a plane below and in front of the anvil jaw member. The carriage 29 has rollers 30 and 31 traveling upon the way 27 and a roller 32 traveling upon the track 28. The carriage is also provided with an outer thrust roller 33 coacting with the outer edge of the way and with an inner thrust roller 34 coacting with the inner edge of the way so that the carriage may be easily moved and is steadily supported.

Mounted on the carriage is a closing jaw which in the embodiment illustrated is in the form of a cylindrical disk 35, the disk being mounted on the vertical spindle 36 and supported by top and bottom thrust bearings designated generally by the numeral 37. The closing jaw is further supported by engagement with the thrust collar 34. The carriage is provided with a handle 38.

With the parts thus arranged the fasteners are first inserted in the holder and secured therein by means of the rod 11. The work is then drawn over the supporting bar 19 and adjusted with its edge between the fasteners as shown in Fig. IV and secured in this position as by means of the thumb tacks. The anvil member is then adjusted so that the fasteners are engaged by the closing jaw as the carriage is moved along.

To attempt to completely set or close the fasteners by one reciprocation of the carriage would require an unnecessary amount of power and also would be likely to result in tilting or distorting the fasteners. Therefore, the adjustable anvil member is adjusted so that the fasteners are only partially set, the operation being repeated until they are completely set. The pawl and ratchet means illustrated affords a step by step adjustment.

When the operation is complete the anvil jaw member may be thrown back and the rod 11 withdrawn releasing the work. I have used the terms "anvil" jaw and "closing" jaw largely as a matter of convenience in description.

It will be noted that the closing jaw member being supported in rotating contact with the thrust roller 34 which is in turn in engagement with the way, is thereby driven, so that it successively rolls upon the fastener and does not tilt or push them sidewise but drives them into the work.

My improved fastener applying machine is highly efficient and easily operated, being especially well adapted for wide belts or aprons but the machine may be used for any width of belt from the maximum down. The machine illustrated is especially designed for very wide belts but I desire to point out that my improvements are adapted and desirable for small machines or machines for lacing narrow belts. I have not attempted to illustrate various embodiments or adaptations contemplated as I believe the disclosure made will enable those skilled in the art to embody or adapt my improvements as may be desired.

Having thus described my invention what I claim as new and desire to secure by Letters Patent is:

1. In a structure of the class described, the combination of a bed, a shaft-like anvil jaw member rotatably mounted at the rear side of said bed, a fastener holder adapted to support a plurality of fasteners operatively associated with said anvil jaw member, means for giving said anvil jaw member a step by step adjustment, a way disposed at the front of said bed in approximately the horizontal plane of and in parallel relation to said anvil jaw member, a track disposed in a plane below and adjacent to said anvil jaw member, a carriage provided with supporting rollers traveling on said way and track and with inner and outer thrust rollers coacting with the edges of said way, and a cylindrical disk-like closing jaw rotatably mounted on said carriage in supporting engagement with the inner thrust roller.

2. In a structure of the class described, the combination of a bed, a shaft-like anvil jaw member rotatably mounted at the rear side of said bed, a fastener holder adapted to support a plurality of fasteners operatively associated with said anvil jaw member, means for giving said anvil jaw member a step by step adjustment, a way disposed at the front of said bed in approximately the horizontal plane of and in parallel relation to said anvil jaw member, a track disposed in a plane below and adjacent to said anvil jaw member, a carriage traveling on said way and track, and a closing jaw on said carriage.

3. In a structure of the class described, the combination of a bed, a shaft-like anvil jaw member rotatably mounted at the rear side of said bed and having a jaw plate disposed above its axial center, a fastener holder adapted to support a plurality of fasteners and pivotally mounted on said anvil jaw member below said jaw plate, means for holding said fastener holder yieldingly outward, means for giving said anvil jaw member a step by step adjustment, a work supporting bar disposed above said anvil jaw member, a way disposed in parallel relation to said anvil jaw member, a carriage on said way, and a closing jaw on said carriage.

4. In a structure of the class described, the combination of a bed, a shaft-like anvil jaw member rotatably mounted at the rear side of said bed and having a jaw plate disposed above its axial center, a fastener holder adapted to support a plurality of fasteners and pivotally mounted on said anvil jaw member below said jaw plate, means for holding said fastener holder yieldingly outward, means for giving said anvil jaw member a step by step adjustment, a way disposed in parallel relation to said anvil jaw member, a carriage on said way, and a closing jaw on said carriage.

5. In a structure of the class described, the combination of a bed, a shaft-like anvil jaw member rotatably mounted at the rear side of said bed, a fastener holder operatively associated with said jaw member and adapted to support a plurality of fasteners, means for giving said anvil jaw member a step by step adjustment, a way disposed in parallel relation to said anvil jaw member, a carriage on said way, and a closing jaw on said carriage.

6. In a structure of the class described, the combination of a bed, a shaft-like anvil jaw member rotatably mounted at the rear side of said bed, a fastener holder operatively associated with said jaw member and adapted to support a plurality of fasteners, a way disposed in parallel relation to said anvil jaw member, a carriage on said way, and a closing jaw on said carriage.

7. In a structure of the class described, the combination of a bed, a shaft-like anvil member rotatably mounted at the rear side of said bed, a fastener holder operatively associated with said jaw member and adapted to support a plurality of fasteners, a work supporting bar disposed above said anvil jaw member, a way disposed in parallel relation to said anvil jaw member, a carriage on said way, and a closing jaw on said carriage.

8. In a structure of the class described, the combination of an adjustably mounted anvil jaw member, a fastener holder operatively associated with said anvil jaw member, a way disposed in parallel relation to said anvil jaw member, a carriage provided with supporting rollers traveling on said way and with a thrust collar coacting with said way, and a disk-like closing jaw rotatably mounted on said carriage in supporting engagement with said thrust collar.

9. In a structure of the class described, the combination of a rotatably mounted anvil jaw member, means for giving said anvil jaw member a step by step rotative adjustment, a fastener holder adapted to receive a plurality of fasteners yieldably mounted on said anvil jaw member, a work supporting means operatively associated with said anvil jaw member, a carriage reciprocating in a plane parallel to the said anvil jaw member, and a closing jaw mounted on said carriage in coacting relation to said anvil jaw member.

10. In a structure of the class described, the combination of an anvil jaw member mounted for step by step adjustment and having fastener holding means operatively associated therewith, a reciprocating carriage, and a rotating closing jaw mounted on said carriage in coacting relation to said anvil jaw member.

11. In a structure of the class described, the combination of an adjustably mounted anvil jaw member, a fastener holder operatively associated with said anvil jaw member, a work supporting bar operatively associated with said anvil jaw member, a way disposed in parallel relation to said anvil jaw member, a carriage traveling on said way, and a closing jaw on said carriage.

12. In a structure of the class described, the combination of a rotatably mounted shaft-like anvil jaw member, a fastener holder mounted on said anvil jaw member adapted to support a plurality of fasteners in coacting relation thereto and above the axial center of the anvil jaw member, means for adjusting said anvil jaw member, a reciprocating carriage, and a rotating disk-like closing jaw carried by said carriage.

13. In a structure of the class described, the combination of a rotatably mounted shaft-like anvil jaw member, a fastener holder mounted on said anvil jaw member adapted to support a plurality of fasteners in coacting relation thereto and above the axial center of the anvil jaw member, means for adjusting said anvil jaw member, a reciprocating carriage, and a closing jaw carried by said carriage.

14. In a structure of the class described, the combination of an anvil jaw member mounted for step by step adjustment, a fastener holding means adapted to support a plurality of fasteners operatively associated with said anvil jaw member, a carriage reciprocating in parallel relation to said anvil jaw member, and a rotating closing jaw on said carriage adapted to successively engage the fasteners as the carriage is reciprocated.

15. In a structure of the class described, the combination of an anvil jaw member mounted for step by step adjustment, a fastener holding means adapted to support a plurality of fasteners operatively associated with said anvil jaw member, a carriage reciprocating in parallel relation to said anvil jaw member, and a closing jaw on said carriage adapted to successively engage the fasteners as the carriage is reciprocated.

16. In a structure of the class described, the combination of an anvil jaw member mounted for rotative step by step adjustment, a fastener holder adapted to support a plurality of fasteners in operative relation to said anvil jaw member, and a reciprocating closing jaw.

17. In a structure of the class described, the combination of an anvil jaw member mounted for rotative step by step adjustment, a fastener holding means adapted to support a plurality of fasteners operatively associated with said anvil jaw member, and a closing jaw reciprocating in parallel relation to said anvil jaw member.

18. In a structure of the class described, the combination of a tiltingly adjustable anvil jaw member, a fastener holder adapted to support a plurality of fasteners in operative relation to said anvil jaw member, and a closing jaw mounted for reciprocating movement in a plane approximately at right angles to the plane of adjustment of said anvil jaw member.

19. In a structure of the class described, the combination of an anvil jaw member mounted for step by step adjustment and having fastener holding means operatively associated therewith, a reciprocating carriage, and a driven rotating closing jaw mounted on said carriage in coacting relation to said anvil jaw member.

20. In a structure of the class described, the combination of an anvil jaw member having fastener holding means operatively associated therewith, and a reciprocatingly mounted driven rotating closing jaw coacting with said anvil jaw member.

21. In a structure of the class described, the combination of a rotatively mounted anvil jaw member, a fastener holder operatively associated with said anvil jaw member, and a closing jaw mounted for reciprocating movement in a plane substantially at right angles to the plane of adjustment of the anvil jaw member.

22. In a structure of the class described, the combination of an anvil jaw member mounted for step by step adjustment and having fastener holding means operatively associated therewith, a reciprocating carriage, and a closing jaw mounted on said carriage in coacting relation to said anvil jaw member.

23. In a structure of the class described, the combination of a rotatably mounted anvil jaw member having a radially disposed jaw face lying within the arc of its bearing, a fastener holding means carried by said anvil jaw member, and a closing jaw operatively associated with said anvil jaw member.

24. In a structure of the class described, the combination of a support provided with a bearing, a jaw rotatably mounted in said bearing and provided with a radially disposed jaw face lying within the arc of its bearing, a fastener holder pivotally mounted on said jaw below its axis, and a second jaw operatively associated with said rotatably mounted jaw.

25. In a structure of the class described, the combination of a rotatably mounted jaw having a face lying at one side of its axis of rotation, a fastener holder mounted on said jaw at the opposite side of its axis to support fasteners in operative relation to its face, a second jaw operatively associated with said rotatably mounted jaw, and means for independently actuating said jaws.

26. In a structure of the class described, the combination of a rotatably mounted jaw having a face at one side of its axis of rotation and in a plane substantially radial to its axis, a second jaw operatively associated with said rotatably mounted jaw, a fastener holder operatively associated with said rotatably mounted jaw to move therewith, and means for independently actuating said jaws.

27. In a structure of the class described, the combination of a support provided with a curved bearing, a jaw rotatably mounted in said bearing and having a jaw face lying in a plane substantially radial to its axis and within the arc of the said curved bearing, a jaw member operatively associated with said rotatably mounted jaw member, a fastener holder mounted on said rotatably mounted jaw member, and means for rotating said rotatably mounted jaw member in its said bearing.

In witness whereof I have hereunto set my hand.

JAMES K. DIAMOND.